United States Patent [19]

Hollier et al.

[11] Patent Number: 5,848,384

[45] Date of Patent: Dec. 8, 1998

[54] ANALYSIS OF AUDIO QUALITY USING SPEECH RECOGNITION AND SYNTHESIS

[75] Inventors: Michael Peter Hollier; Philip John Sheppard, both of Ipswich, United Kingdom

[73] Assignee: British Telecommunications Public Limited Company, London, England

[21] Appl. No.: 765,737

[22] PCT Filed: Aug. 17, 1995

[86] PCT No.: PCT/GB95/01952

§ 371 Date: Jan. 13, 1997

§ 102(e) Date: Jan. 13, 1997

[87] PCT Pub. No.: WO96/06496

PCT Pub. Date: Feb. 29, 1996

[30] Foreign Application Priority Data

Aug. 18, 1994 [EP] European Pat. Off. ............. 94306082

[51] Int. Cl.$^6$ ........................................................ H04M 3/22
[52] U.S. Cl. ........................................... 704/831; 704/233
[58] Field of Search .................................... 704/231, 233, 704/226

[56] References Cited

U.S. PATENT DOCUMENTS 4,063,031  12/1977  Grunza ..................................... 704/233

*Primary Examiner*—David D. Knepper
*Assistant Examiner*—Harold A. Zintel
*Attorney, Agent, or Firm*—Nixon & Vanderhye, P.C.

[57] ABSTRACT

An apparatus for monitoring signal quality in a communications link is provided which recognizes speech elements in signals received over the communications link and generates therefrom an estimate of the original speech signal, and compares the estimated signal with the actual received signal to provide an output based on the comparison.

13 Claims, 13 Drawing Sheets

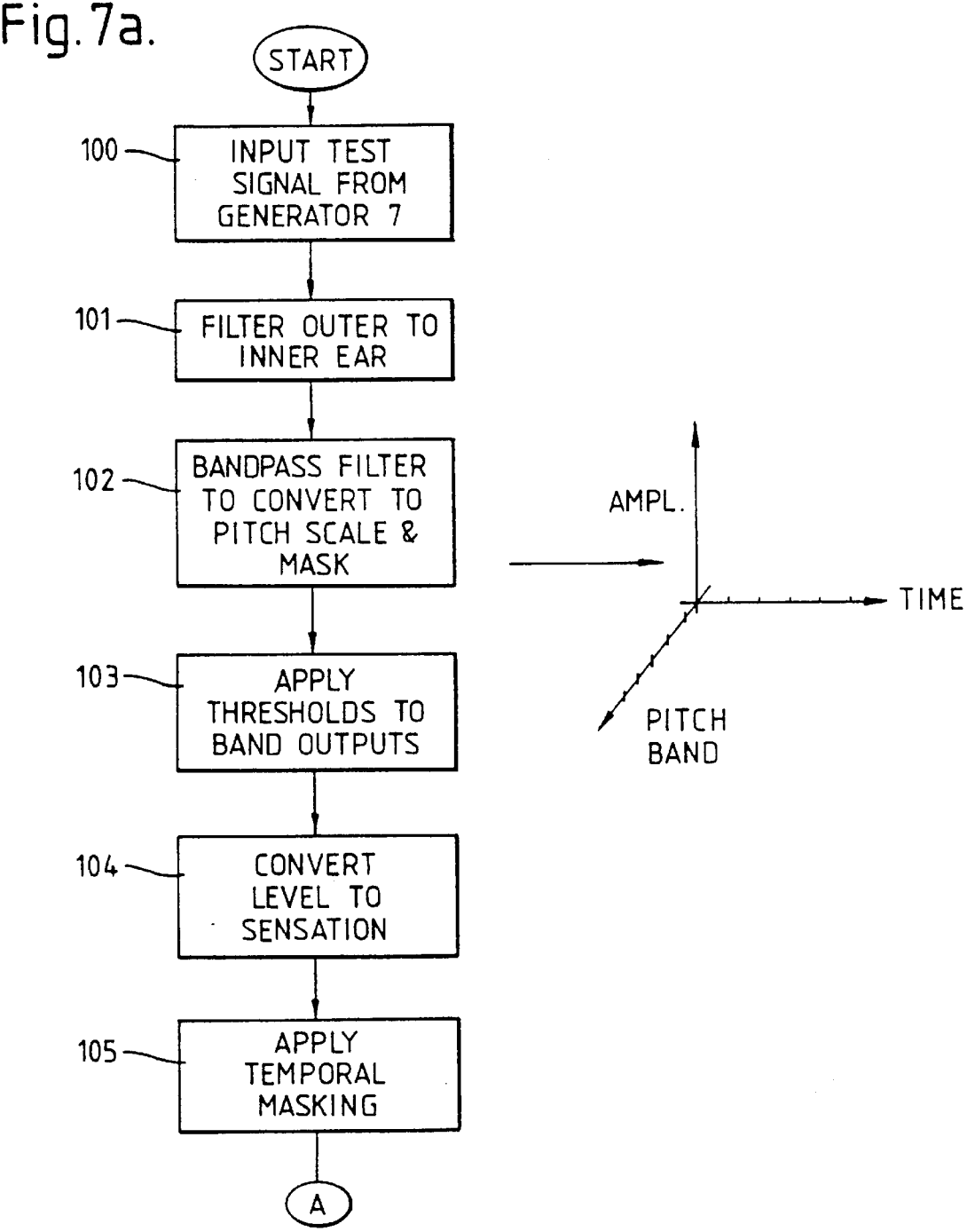

| 2 | 2 | 2 | 2 | 2 | 2 | 2 | 2 | 2 | 2 |
|---|---|---|---|---|---|---|---|---|---|
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |
| 2 | 2 | 2 | 2 | 2 | 2 | 2 | 2 | 2 | 2 |

ERROR-ACTIVITY= 200     ERROR-ENTROPY= 4.605

| 0.1 | 0.1 | 0.1 | 0.1 | 0.1 | 0.1 | 0.1 | 0.1 | 0.1 | 0.1 |
|---|---|---|---|---|---|---|---|---|---|
| 0.1 | 5 | 5 | 5 | 5 | 5 | 0.1 | 0.1 | 0.1 | 0.1 |
| 0.1 | 5 | 11 | 11 | 11 | 5 | 0.1 | 0.1 | 0.1 | 0.1 |
| 0.1 | 5 | 11 | 24.5 | 11 | 5 | 0.1 | 0.1 | 0.1 | 0.1 |
| 0.1 | 5 | 11 | 11 | 11 | 5 | 0.1 | 0.1 | 0.1 | 0.1 |
| 0.1 | 5 | 5 | 5 | 5 | 5 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |

ERROR-ACTIVITY= 200    ERROR-ENTROPY=3.294

Fig.12b.

| 0.1 | 0.1 | 0.1 | 0.1 | 0.1 | 0.1 | 0.1 | 0.1 | 0.1 | 0.1 |
|---|---|---|---|---|---|---|---|---|---|
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 190 | 0.1 | 0.1 |
| 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 |

ERROR-ACTIVITY= 200    ERROR-ENTROPY= 0.425

Fig.12c.

| 1 | 1 | 1 | 1 | 1 | 1 | 1 | 1 | 1 | 1 |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1901 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

ERROR-ACTIVITY= 2000    ERROR-ENTROPY= 0.425

ANALYSIS OF AUDIO QUALITY USING SPEECH RECOGNITION AND SYNTHESIS

FIELD OF THE INVENTION

This invention relates to the analysis of audio quality of a telecommunications system. It is desirable to monitor the performance of a telecommunications system in order to identify faults, and to ensure the optimal routing of network traffic.

DESCRIPTION OF RELATED ART

When specifying and monitoring performance of a telecommunications system it is highly desirable to apply a measurement which directly reflects those parameters which will determine likely customer satisfaction. By modelling the human senses, e.g. hearing, it is possible to estimate the subjective performance of real systems, e.g. the subjective audio quality. This approach to measurement, known as perceptual analysis, is an important emerging area.

Perceptual analysis techniques are important because of two main benefits:

(i) The technique can predict the performance of a complex, non-linear system, e.g. low-bit-rate speech coding schemes, which it is not feasible to measure with conventional engineering measurement methods.

(ii) The measurement yields a result in terms of the likely subjective audio quality. This is exactly the information required to optimise system design and operation to provide the required subjective quality.

Existing perceptual analysis methods include both analogous and empirical models. Examples of analogous models are discussed in:

[1] Wang S, Sekey A, Gersho A, "An Objective Measure for Predicting Subjective Quality of Speech Coders", IEEE J. on Selected areas in Communications, Vol.10, No. 5, June 1992.

[2] Beerends J G, Stemerdink J A, "A Perceptual Audio Quality Measure Based on a Psychoacoustic Sound Representation", J Audio Eng. Soc., Vol. 40, No.12, Dec. 1992.

[3] Stuart J R, "Psychoacoustic Models for Evaluating Errors in Audio Systems":, Procs. 10A, Vol. 13, Part 7, November 1991.

[4] Hollier M P, Hawksford M O, Guard D R, "Characterisation of Communications Systems Using a Speech-Like Test Stimulus", J Audio Eng. Soc., Vol. 41, No.12, Dec. 1993.

Empirical models are discussed in:

[5] Halka U, Heuter U, "A New Approach to Objective Quality-Measures Based on Attribute-Matching", Speech Comms, Early 1992.

[6] NTIA, CCITT SG XII Contribution "Effects of Speech Amplitude Normalization on NTIA Objective Voice Quality Assessment Method", DOC SQ-74.91, Dec. 1991.

[7] Irii H, Kozono J, Kurashima K, "PROMOTE-A System for Estimating Speech Transmission Quality in Telephone Networks", NTT Review, Vol.3, No. 5, September 1991.

All these models require knowledge of the input signal, i.e. the undistorted speech signal, in order to make comparative measurements from which the performance prediction is formulated.

FIG. 1 shows an idealised perceptual analysis system 8 receiving both the original version of a speech signal directly from an input 1 and the same signal distorted by the system 2 under test, from which it is able to estimate the subjectivity of the distortions added by the system under test.

The excitation in the human auditory system is algorithmically modelled for the original and distorted versions of the input signal, and a comparison of the outputs of the model for the two signal versions yields an estimate of the audible error. Further model stages interpret the audible error to estimate its subjectivity and hence the audio quality.

There is a further class of performance measurement which is of considerable commercial significance, but which cannot be addressed with existing perceptual analysis techniques. This requirement is to assess, non-intrusively, the subjective audio quality of network connections and routes carrying live traffic. Such a measurement would be highly advantageous in providing the following facilities:

(i) the provision of connection quality monitoring, allowing the performance of the network to be assessed, (ii) the provision of information on problem connections so that remedial action can be taken, and (iii) the automatic provision of information on the subjective performance of particular connections to the "intelligent network" which will be able to route traffic accordingly. This will allow a more direct optimisation of subjective audio quality than is possible with conventional engineering measurement methods.

The performance of perceptual analysis for objectively assessing the subjective speech quality of complex systems has been demonstrated by Hollier, Hawksford and Guard in the reference [4] above, and in [8] Hollier M P, Hawksford M O, Guard D R, "Objective Perceptual Analysis: Comparing the Audible Performance of Data Reduction Systems", 96th AES Convention, Preprint 3797, February 1994. However, in order to apply perceptual analysis to the non-intrusive measurement, say of network traffic, knowledge of the input signal is required.

The input signal cannot be transmitted to the point of analysis in real time without being subject to the same kinds of distortion as are imposed by the system under test. With reference to FIG. 1, if the system under test (2) is a real telecommunications system as distinct from a test apparatus in a laboratory, the hypothetical connection 'A' (which is implicitly distortion-free) will not exist.

It is known to apply a test signal to a communications link in order to test the link. However, this requires prior knowledge of the test signal at the receiving end so the test signal cannot be live traffic. Moreover, whilst the test signal is being transmitted no real (revenue-earning) traffic can be carried.

SUMMARY OF THE INVENTION

According to the invention there is provided a method of analysis of the audio quality of a system carrying speech signals, comprising the steps of:

applying to the output of the communications system a speech recognition process;

generating thereby an estimate of the original speech signal applied to the input of the communications system;

comparing the estimated input signal with the output signal; and generating a performance estimate based on said comparison.

By reconstructing the input signal the application of comparative analysis techniques to non-intrusive measurement is possible.

The invention is particularly suitable for, but not limited to, perceptual analysis techniques of the kind described above.

In a preferred arrangement, the method comprises the additional step of adapting the macro-properties of the speech elements in the estimated signal to match those in the output signal. The term 'macro-properties' is used in this specification to mean the properties of each speech element such as pitch and duration which vary between talkers, as distinct from the microstructure which determines the individual phonemes being spoken

BRIEF DESCRIPTION OF THE DRAWINGS

An embodiment of the invention will now be described, by way of example only, with reference to the accompanying drawings, in which:

FIGS. 7a and 7b form a flow diagram indicating schematically the operation of the analysis unit in the embodiment of FIG. 6;

FIG. 9a represents a low magnitude non-linear distortion;

FIG. 9b corresponds to FIG. 9a but with crossover distortion;

FIG. 9c corresponds to FIG. 9a but with higher amplitude non-linear distortion;

FIG. 9d corresponds to FIG. 9a but with MNRU distortion;

FIG. 9e corresponds to FIG. 9a but with temporal clipping distortion such as caused by a voice activity detector;

FIG. 10a shows a plot of distortion amplitude over time and pitch axes for homogeneous distortion;

FIG. 10b is a table showing the amplitude values for the cells of the plot of FIG. 10a;

FIG. 12b is a corresponding table of amplitude values;

FIG. 12c is a table of amplitude values corresponding to the multiplication of the distortion of FIG. 12a by a factor of 10);

DETAILED DESCRIPTION OF EXEMPLARY EMBODIMENTS

Figure 1:
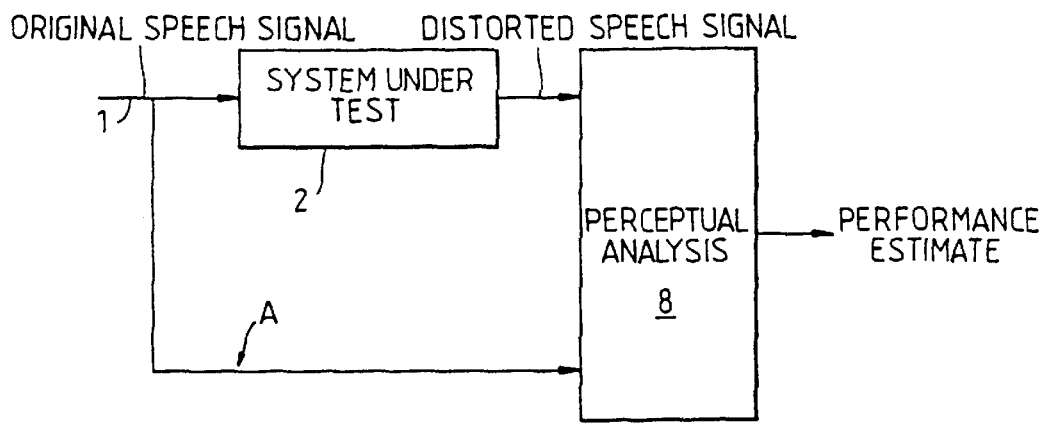
FIG. 1 shows the theoretical prior art system discussed above.
Figure 2:
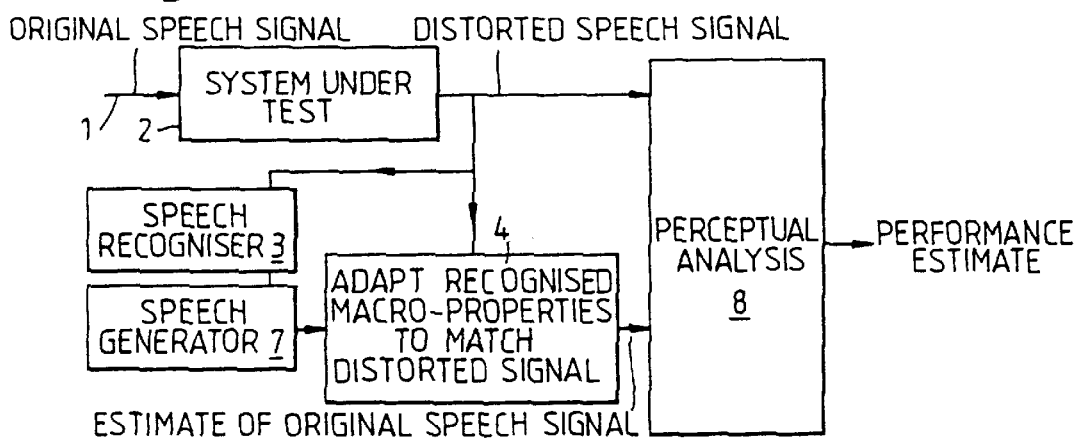
FIG. 2 shows the provision of an estimated "original signal", provided by a speech recognizer, synthesizer and adapter, to a perceptual analysis system which produces an estimate of subjective audio quality.

A description of the functional blocks in FIG. 2 is given below, and includes references to established examples of each process.

The signal from input 1 is original speech material, or a speech-like test-stimulus such as that described in the applicant's co-pending International application WO 94/00922. This is transmitted through the system (2) under test to the measurement location. The distorted speech signal is then passed to a speech recognizer (3) which classifies the distorted speech sound, to facilitate selection of an "original sound" template.

The term "speech recognition" is used to mean the recognition of speech events from a speech signal waveform is termed speech recognition. In the area of speech technology, the use of machines to recognize speech has been the goal of engineers and scientists for many years. A variety of practical speech recognizers have appeared in the literature including description of; HMM (Hidden Markov Models) Cox 1990: [Wheddon C and Linggard R: 'Speech communication', Speech and Language Processing, Chapman and Hall (1990)] fixed dimension classifiers (such as nearest neighbor, Gaussian mixtures, and multi-layer perception) [Woodland & Millar 1990: in Wheddon C and Linggard R: 'Speech communication', Speech and Language Processing, Chapman & Hall (1990)], and neural arrays [Tattersall, Linford & Linggard 1990: in Wheddon C and Linggard R: 'Speech communication', Speech and Language Processing, Chapman and Hall (1990)]. The above three references all appear in 'Speech communication', Speech and Language Processing, Chapman and Hall (1990)].

Most recognition systems consist of a feature extractor and a pattern matching process (classification) and can be either speaker dependent or independent. Speaker dependent recognizers are trained by the user with each of the words required for the particular application. Speaker independent recognition systems have a prescribed vocabulary which cannot be changed [Wheddon C & Linggard R: 'Speech communication', Speech and Language Processing, Chapman & Hall (1990)]. In both systems features are extracted from the acoustic signal which are passed to a classifier which determines which of the words in its vocabulary was spoken. Features are extracted using transform or digital filtering techniques to reduce the amount of data passed to the classifier. The resulting patterns are then warped in time to optimally align with the reference patterns [Sakoe H and Chibass: 'Dynamic programming algorithm optimisation for spoken word recognition', IEEE Trans Acoust Speech and Signal Proc, 26 (1978)]. Statistical models such as hidden Markov models [Cox S J: 'Hidden Markov models for automatic speech recognition: theory and application', BT Telecom Technol J, 6, No. 2 (1988)] are also widely used. Here a sequence of features is compared with a set of probabilistically defined word models. Feature extraction and pattern matching techniques may also be extended to cope with connected words [Bridle J S, Brown M D and Chamberlain R M: 'An algorithm for connected word recognition', Automatic Speech Analysis and Recognition, Reidal Publishing Company (1984)] which is a far more complex task as the number of words is unknown and the boundaries between words cannot be easily determined in real time. This results in increased computation time [Atal B S and Rabiner L R: 'Speech research directions', AT&T Technical Journal 65, Issue 5 (1986)] and a corresponding increase in hardware complexity.

Hidden Markov Models suitable for the present purpose are described in Baun L E, "An Inequality and Associated Maximization Technique in Statistical Estimation for Probabilistic Functions of Markov Processes" Inequalities III, 1–8, 1972, or Cox S J, "Hidden Markov Models For Automatic Speech Recognition: Theory and Application", in "Speech and Language Processing" edited by Wheddon C and Linggard R, Chapman and Hall, ISBN 0 412 37800 0, 1990. The HMM represents known words as a set of feature vectors, and, for a given incoming word, calculates the a posteriori probability that its model will produce the observed set of feature vectors. A generic "original sound" file can then be selected from memory for the recognized word. The "original sound" file so identified is then used to control a speech generator 7 to generate an audio signal corresponding to the word.

Figure 3:
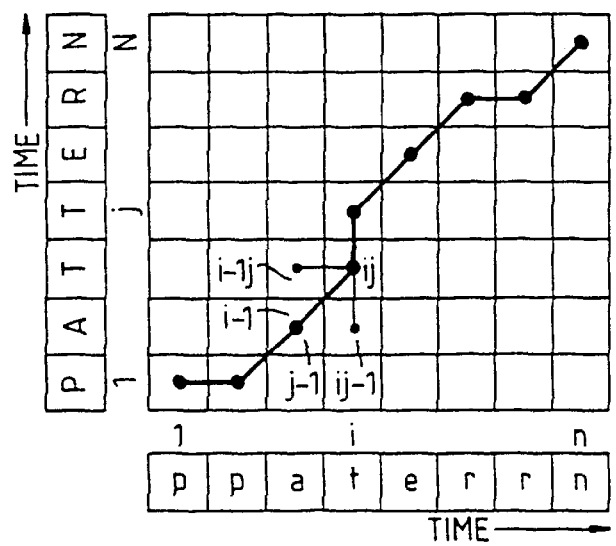
FIG. 3 illustrates a matching technique forming part of the process.
Figure 4:
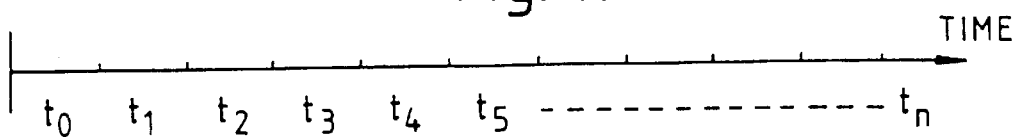
FIG. 4 shows schematically the structure of a speech signal over time.

The macro properties of the "original sound" are now adapted to those of the actual speech event in an adaptor 4. The mathematical technique used, when applied to speech recognition, is known as dynamic time warping: see Holmes J N, "Speech Synthesis and Recognition", Van Nostrand Reinhold (UK) Co. Ltd., ISBN 0 278 00013 4, 1988, and Bridle J S, Brown M D, Chamberlain R M, "Continuous Connected Word Recognition Using Whole Word Templates", Radio and Electronics Engineer 53, Pages 167–177, 1983. The time alignment path between the two words (uttered and recognized "original"), see FIG. 3, describes the time warping required to fit the stored "original sound" to that of the detected word. The pitch of the signal may also be matched to that of the stored "original sound". This is to allow the general "original sound" file to be matched to the actual speech utterances, making the technique practically robust, and talker independent.

The estimated original sound and the actual signal received are next subjected to a perceptual analysis in an analyser 8. This analysis provides an estimation of the subjective audio quality resulting from the system under test. The analysis can be performed as described in the applicants' published International Patent Applications Nos. WO95/15035 and WO95/01011 Application no. WO95/15035 describes telecommunications testing apparatus comprising analysis means arranged to receive a distorted signal which corresponds to a test signal when distorted by telecommunications apparatus to be tested, the analysis means comprising means for periodically deriving, from the distorted signal, a plurality of spectral component signals responsive to the distortion in each of a plurality of spectral bands, over a succession of time intervals, the analysis means being arranged to generate a measure of the subjective impact of the distortion due to the telecommunications apparatus, said measure of subjective impact being calculated to depend upon the spread of the distortion over time and/or said spectral bands. This system will now be illustrated.

The analysis is intended to provide an acceptability signal output which depends upon the distortion of the input signal similar to the response of a human ear, as it is presently understood.

Without dwelling upon the physical or biological mechanisms giving rise to these phenomena, it is well known that the human perception of sound is affected by several factors. Firstly the presence of one sound "masks" (i.e. suppresses the perception of) another sound in a similar spectral (frequency) region. The extent to which the other sound is masked depends both on how close in pitch it is to the first sound and on the amplitude of the first sound. Thus, the human perception of errors or distortions in a sound depends upon the sound itself; errors of low amplitude in the same spectral region as the sound itself may be masked and correspondingly be inaudible (as, for example, occur with quantising errors in sub-band coding).

Secondly, the masking phenomenon has some time dependence. A sound continues to mask other sounds for a short period after the sound is removed: the amplitudes of the subsequent sounds which will be masked decay rapidly after the removal of the first sound. Thus, errors or distortions will be masked not only by the present signal but also by portions of the signal which preceded it (to a lesser extent). This is referred to as "forward masking". It is also found that the application of a high level sound just after a lower level sound which would otherwise have been audible retrospectively makes the earlier sound inaudible. This is referred to as "backward masking".

Thirdly, the human ear is not directly responsive to the frequency, but to the phenomenon perceived as "pitch" of a sound, which corresponds to a non-linear warping of the frequency axis.

Fourthly, the human ear is not directly responsive to amplitude, even when a signal is not masked, but to the phenomenon perceived as loudness which is a non-linear function of amplitude.

Accordingly, in this embodiment the analyser 8 is arranged to process the signal received from the system 2 to determine how significant or objectionable the distortion produced thereby in the test signal will be to a human listener, in accordance with the above known characteristics of the human ear.

More particularly, the analysis unit 8 is arranged to determine what the response of the human ear will be to the estimated original signal 1; and then similarly to process the signal from the telecommunications apparatus 2 to determine the extent to which it perceptibly differs from the original signal, by determining the extent to which distortions are perceptible.

Figure 5A:
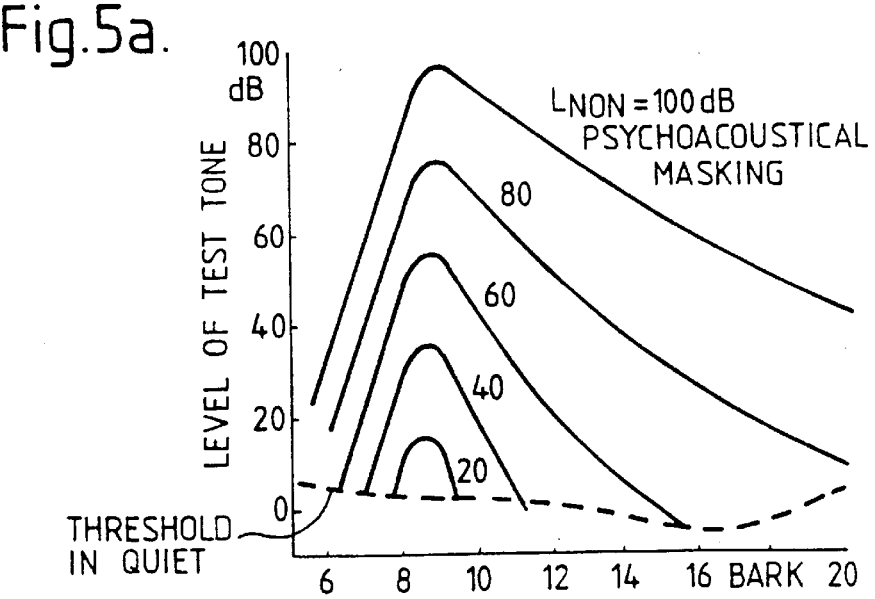
FIG. 5a is a graph of the psychoacoustic masking threshold (dBs) against a pitch (e.g. approximately logarithmic frequency) axis in critical band rate (Bark) units, for five different levels of masking narrowband noise.

FIG. 5a shows schematically the variation of the spectral masking threshold (the threshold above which a second sound is obscured by a first) for narrow band noise at a fixed frequency. The five curves of amplitude against frequency, represented on the logarithm (bark) scale, are for progressively higher levels of masking noise, and it will be seen that the effect of increasing the level of masking noise is to cause a roughly linear increase in the masking threshold at the masking noise frequency, but also to change the shape of the threshold away from the noise frequency (predominantly towards higher frequencies). The masking effect is therefore amplitude non-linear with respect to the amplitude of the masking noise.

For a given masking noise level, the width (measured, for example, at the 3 dB points below the central masking frequency) of the masked spectral band varies with the frequency of the masking noise. This variation of the width of the masked bands is related to the characteristic of the human auditory filter shape for frequency discrimination, and therefore to the human perception of pitch.

Figure 5B:
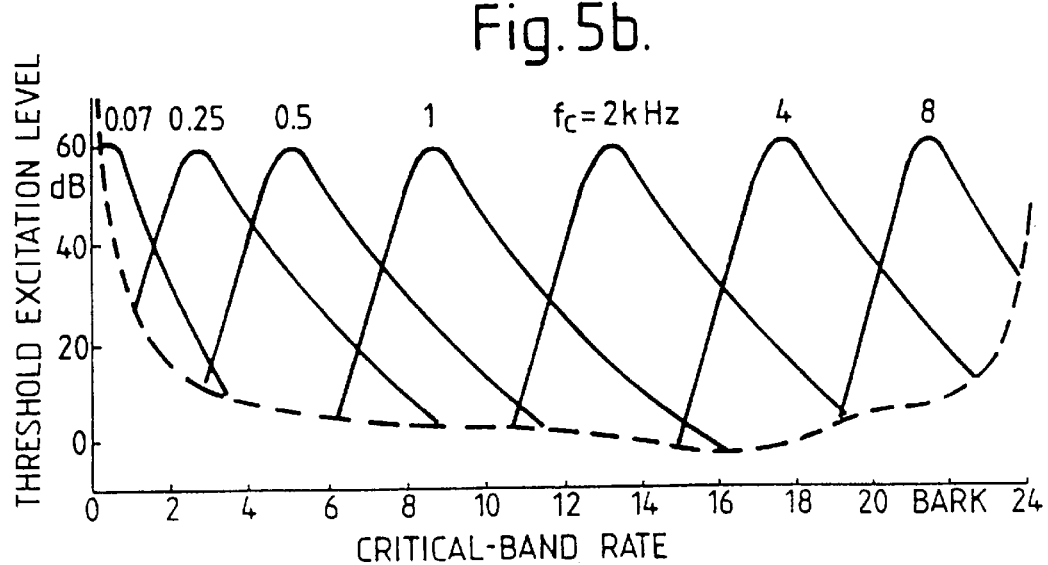
FIG. 5b is a diagram showing the variation of excitation threshold on a pitch (approximately logarithmic frequency) axis in critical band rate (Bark) units, for masking noise at seven given center frequencies

Accordingly, as shown in FIG. 5*b*, a scale of pitch, rather than frequency, can be generated from the frequency scale by warping the frequency scale, so as to create a new scale in which the widths of masking bands are constant. FIG. 5*b* shows the critical band rate, or Bark, scale which is derived by considering a set of narrow band masking tones at different frequencies which cross at the −3 dB point. The Bark scale used in FIGS. 5*a* and 5*b* is described, for example, in "Audio Engineering and Psychoacoustics: Matching Signals to the Final Receiver, the Human Auditory System", J. Audio Eng. Soc. Vol. 39, March 1991, Zwicker and Zwicker.

The critical bands shown in FIG. 5*b* are similar in shape (on the frequency axis) below 500 hertz when represented on a linear frequency scale. Above 500 hertz, they are similar in shape when viewed on a logarithmic frequency scale. Since the telephony band width is typically 300 to 3150 hertz, and telecommunications apparatus is often band limited to between these limits, the transformation to the pitch scale in this embodiment ignores the linear region below 500 hertz with only a small compromise in accuracy.

Figure 6:
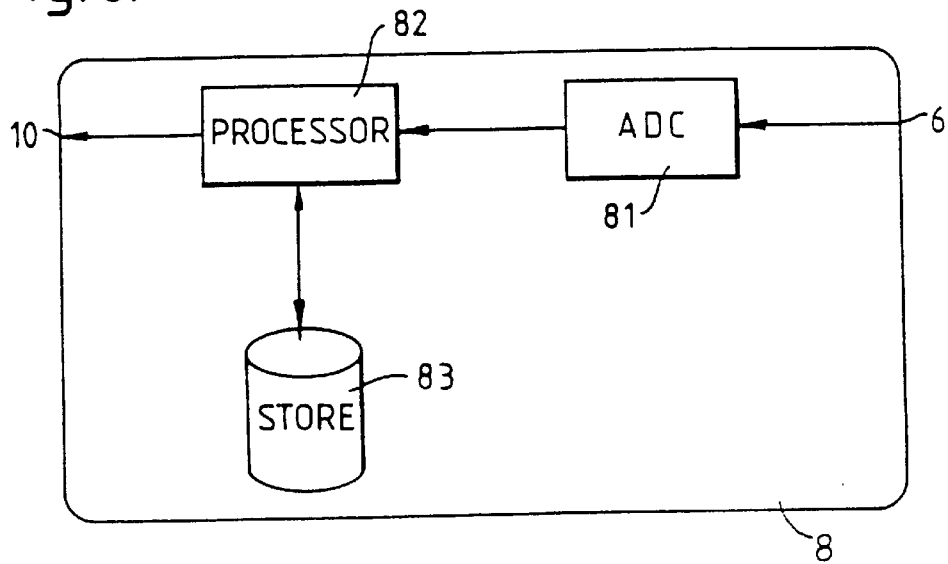
FIG. 6 is a block diagram showing the analysis unit 8 forming part of the embodiment of FIG. 2.

Referring to FIG. 6 the analysis unit 8 comprises an analogue to digital converter (ADC) 81 arranged to receive signals from the input port 6 and produce a corresponding digital pulse train; an arithmetic processor 82 (for example, a microprocessor such as the Intel 80486 processor, or a digital signal processing device such as the Western Electric DSP 32C or the Texas Instruments TMS C30device), coupled to receive the digital output of the ADC 81, a memory device 83 storing instruction sequences for the processor 82 and providing working memory for storing arithmetic results, and an output line 84 from the processor 82 connected to the output 10.

Figure 7B:
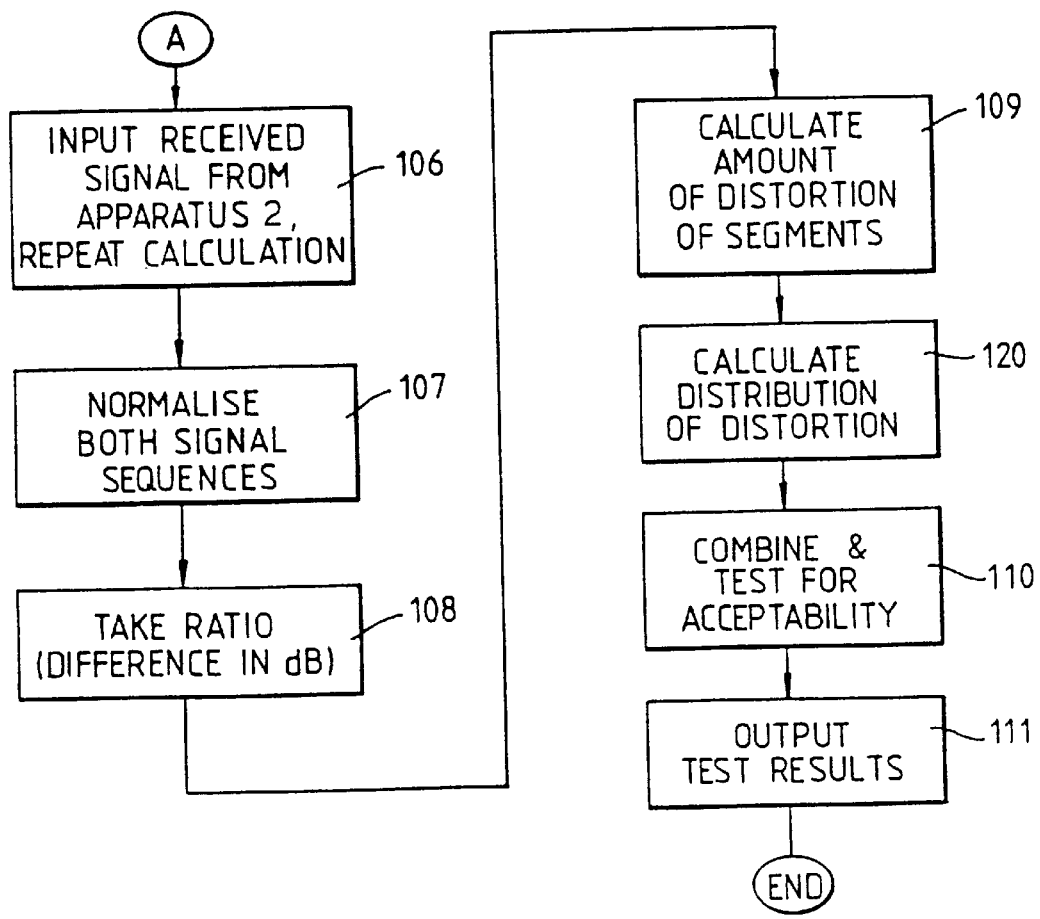

Referring to FIGS. 7*a* and 7*b* the processes performed by the processor 82 in this embodiment will now be described.

Firstly, the signal supplied from the speech generator 7 and adapter 4 is input to the input port 6 in a step 100. In the next step 101, the signal from the ADC 81 is filtered by a filter which corresponds to the transfer function between the outer portions of the ear and the inner ear. The filtering may typically be performed by executing a digital filtering operation in accordance with filter data stored in the memory 83. The filter may be characterized by a transfer function of the type described in "Psychoacoustic models for evaluating errors in audio systems", J.R. Stuart, Procs. IOA, vol. 13, part 7, 1991.

In fact, the transfer function to the inner ear will vary depending upon whether the sound is coupled closely to the ear (e.g. through a headset) or more distantly (e.g. from a loudspeaker); accordingly, the processor 82 and store 83 may be arranged to store the characteristics of several different transfer functions corresponding to different sound locations related to the type of telecommunications apparatus 2 on test, and to select an appropriate filter in response to a user input specifying the telecommunications apparatus type. The filtered signal after the execution of the step 101 corresponds to the signal as it would be received at the inner ear.

Next, in a step 102, the signal is split into a plurality of spectral bands having bandwidths which vary logarithmically with frequency so as to effect the transformation from frequency to pitch. In this embodiment, the signal is bandpass filtered into 20 bands each one-third of an octave in bandwidth, from 100 hertz to 8 kilohertz, according to International Standard ISO 532B; the ISO band filters are similar in shape when viewed on a logarithmic frequency axis and are well known and documented. The average signal amplitude in each of the 20 bands is calculated each 4 milliseconds, and the signal after filtering thus comprises a series of time segments each comprising 20 frequency band amplitude values. This bandpass filtering is performed for all the values in the test signal (which lasts on the order of several seconds, for example, 10 seconds).

The relatively wide filters take account of the masking within each filter band, and the broad, overlapping skirts of the filters ensure that spectral masking due to neighboring frequencies is also taken account of.

Next, in step 103, frequency dependent auditory thresholds specified in International Standard ISO 226 are applied to each of the band outputs. This simulates the effect of the minimum audibility threshold indicated in FIG. 5*a*.

Next, in step 104, the bandpass signal amplitudes are converted to a phone or sensation level which is more equivalent to the loudness with which they would be perceived by a human auditory system. The conversion is non-linear, and depends upon both signal amplitude and frequency. Accordingly, to effect the conversion, the equal loudness contours specified in international standard ISO 226 are applied to each of the band outputs. Both these equal loudness contours and the thresholds used in step 103 are stored in the memory 83.

Next, in step 105, a temporal masking (specifically forward masking) is performed by providing an exponential decay after a significant amplitude value. In fact, the rate of decay of the masking effect depends upon the time of application of the masking sound; the decay time is higher for a longer time of application than for a shorter time. However, in this embodiment, it is found sufficient to apply a fixed exponentially weighted decay, defined by $y = 56.5 * 10^{(-0.01x)}$, (where y represents level and x represents time) which falls between the maximum decay (corresponding to over 200 milliseconds duration) and the minimum decay (corresponding to 5 milliseconds duration) encountered in practice.

In applying the forward masking, at each time segment for each bandpass filter amplitude, masking values for the corresponding bandpass in the three following time segments are calculated, using the above exponential decay. The three values are compared with the actual amplitudes of those bands, and if higher than the actual amplitudes, are substituted for the actual amplitudes.

As noted above, it is also possible for a sound to mask an earlier occurring sound (so called "backward masking"). Preferably, in this embodiment, the forward masking process is replicated to perform backward masking, using the same type of exponential decay, but with different numerical constants (in other words, for each time segment, values of masking for earlier occurring time segments are calculated, and if higher than the actual amplitudes for those bands, are substituted for the actual amplitudes).

Thus, after step 105 the calculated signal data comprises a succession of time segment data each comprising 20 bandpass signal amplitudes, thresholded so that some amplitudes are zero, and the amplitude of a given band in a given time segment being dependent upon the amplitudes of corresponding bands in past and future time segments due to the forward and backwards masking processing.

This corresponds to a surface indicating, along the signal pitch and time axes, the masking effect which the test signal would have had upon the human ear if directly applied without the telecommunications apparatus 2.

Figure 8A:
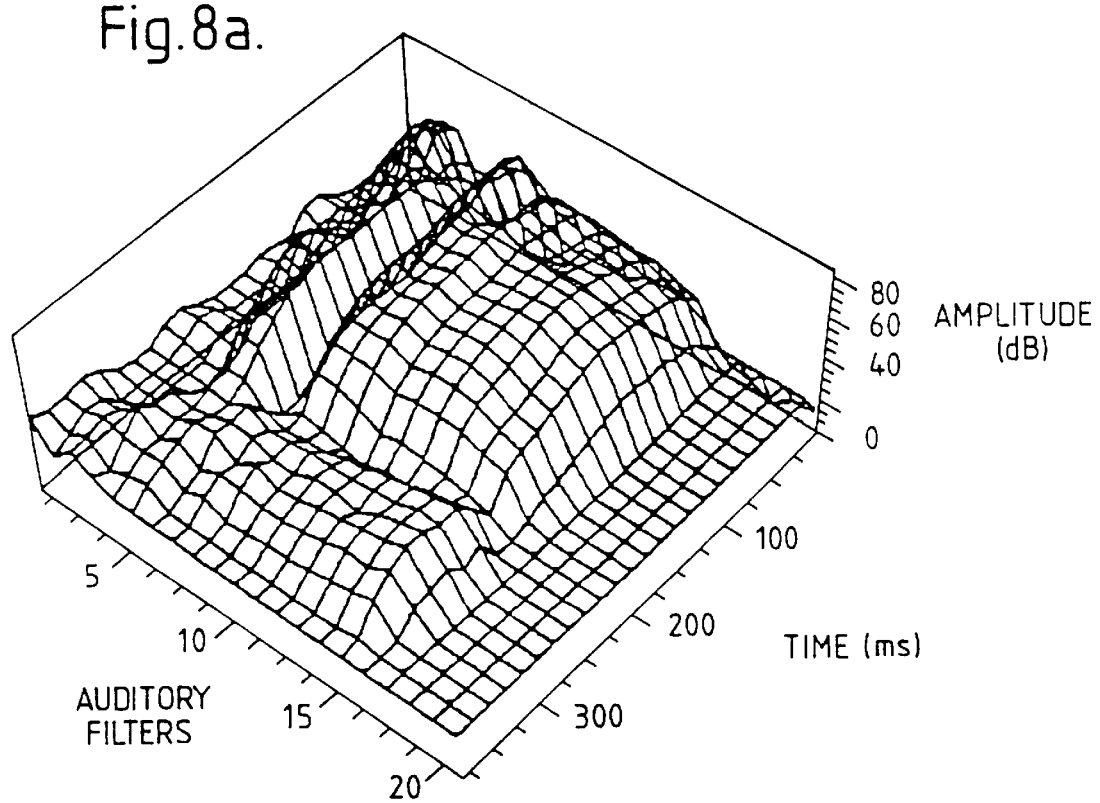
FIG. 8a shows schematically an estimate formed in this embodiment of amplitude of excitation, as a function of time and pitch, which would be produced in the human ear by a predetermined speech-like signal.
Figure 8B:
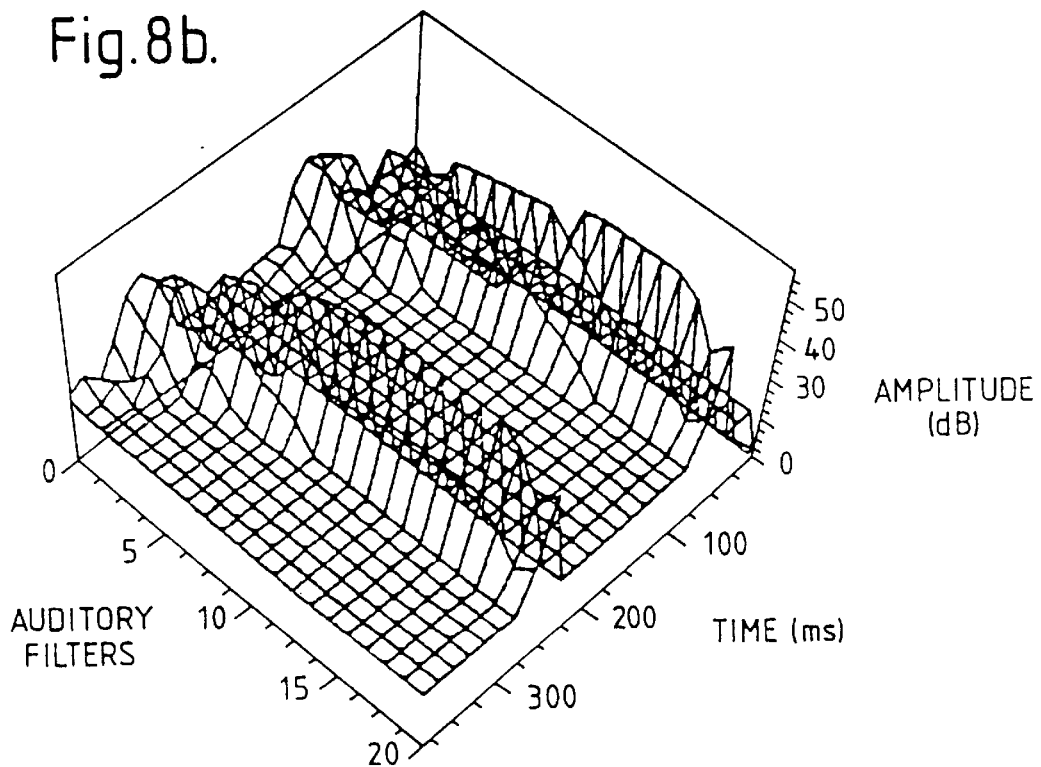
FIG. 8b is a corresponding plot showing the excitation which would be produced by two spaced clicks.

FIGS. 8a and 8b show excitation surfaces generated by the above process. FIG. 8a corresponds to a speech event comprising a voiced sound followed by an unvoiced sound; the format structure of the first sound and the broad band nature of the second sound can readily be distinguished. FIG. 8b shows a corresponding surface for two clicks, and the effect of the forward masking stage 105 of FIG. 7 is clearly visible in the exponential decays therein.

The results of the process are then held in the store 83 for use later.

In step 106, the same original signal is supplied from the telecommunications apparatus 2 to the input port 6 of the test apparatus 8. The calculation stages 101–105 are then repeated, to calculate a corresponding surface for the received signal from the telecommunications apparatus 2.

Having calculated the effect on the ear (excitation) of the estimated signal and of the direct output from the telecommunications apparatus 2 (the distorted signal), the difference in the extent to which the two excite the ear corresponds to the level of distortion of the test signal as perceived by the human auditory system. Accordingly, the amplitude transfer function of the telecommunications apparatus is calculated, for each segment, by taking the ratio between the corresponding bandpass amplitudes stored in the store 83 (or where, as in FIG. 8a or 8b, the bandpass amplitudes are represented on a dB scale, by taking the difference between the amplitude in dBs). To avoid an overall gain term in the transfer function, which is irrelevant to the perceived distortion produced by the telecommunications apparatus, each bandpass term may be normalized by dividing (or, when represented in dBs, subtracting) by the average amplitude over all bandpass filter outputs over all time segments in the test signal sequence, in step 107.

Figure 9A:
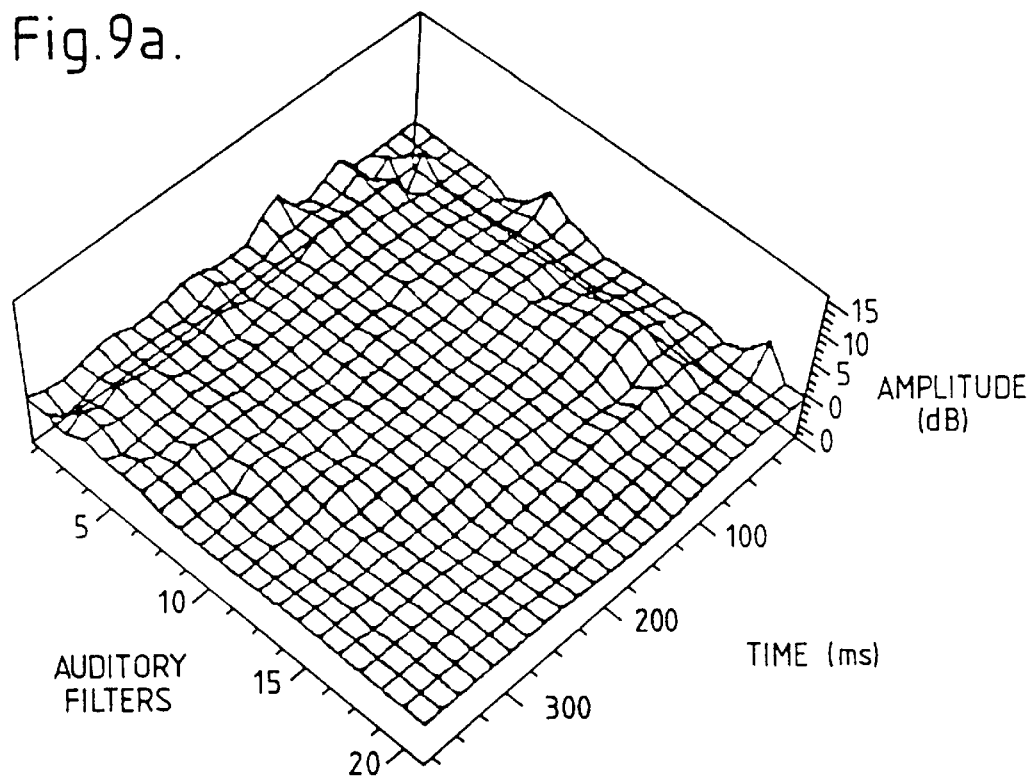
FIG. 9a to 9e are diagrams of distortion amplitude (i.e. the difference in amplitude between original and distorted excitation patterns) over pitch and time axes for various types of distortion of the speech signal depicted in FIG. 8a: more specifically.

If the estimated original signal and the output of the telecommunications apparatus 2 were to be identical but for some overall level difference (that is to say, if the telecommunications apparatus 2 introduces no distortion), the ratio between each bandpass filter output of the two signals would be unity, and the logarithmic difference in dBs in amplitude will be zero; accordingly, the plot of the surface representing the distortion over time and pitch would be completely flat at all times and in all pitch bands. Any deviation is due to distortion in the telecommunications apparatus. Additive distortion errors will appear as peaks, and signal loss will appear as troughs, relative to the undistorted average level. An example of such a surface is shown at FIG. 9a, which represents the distortion surface for the sound of FIG. 8a. FIG. 9b to 9e represent similar surfaces, but different types of distortion have been introduced to the input signal. It will be seen that the distortions which are not recognized and regenerated by the speech recognizer 3/generator 7, introduce large differences between the original and reconstructed signals.

The sequence of sets of bandpass auditory excitation values (corresponding to a surface along the time and pitch axes) is divided into contiguous sectors of length 96 milliseconds (i.e. 48 successive 2 millisecond segments) so as to include at least two different values for the lowest pitch band. The total amount of error or error activity, is calculated in step 109 as:

Error Activity, $$E_A = \sum_{i=1}^{48} \sum_{j=1}^{20} |c(i,j)|$$

where c(i,j) is the error value in the $i^{th}$ time segment and $j^{th}$ pitch band of the error surface sector to be analyzed.

This gives an indication of the absolute amount of distortion present.

Then, the distribution of the error over time and pitch (or rather, the entropy of the distortion, which corresponds to the reciprocal of the extent to which the energy is distributed) is calculated in step 120 as follows:

Error entropy, $$E_E = -\sum_{i=1}^{48} \sum_{j=1}^{20} a(i,j)*\ln(a(i,j))$$

where $$a(i,j) = \frac{|c(i,j)|}{E_A}$$

The log term in the above expression controls the extent to which the distribution of energy affects the entropy $E_E$, acting as a non-linear compression function.

It is found that the error activity and error entropy criteria together correspond well to the subjectively perceived level of distortion, as the listener will find a high level of error considerably more noticeable if it is concentrated at a single pitch over a short period of time, rather than being distributed over pitch and time.

The two measures are combined, together with appropriate weightings, and the combined measure is thresholded in step 110. An output signal is generated (in step 111) to indicate whether or not the threshold has been passed.

FIGS. 10a, 10b, 11a, 11b, 12a, 12b show theoretical idealised results of this process for illustrative purposes.

Figures 10A, 10B:
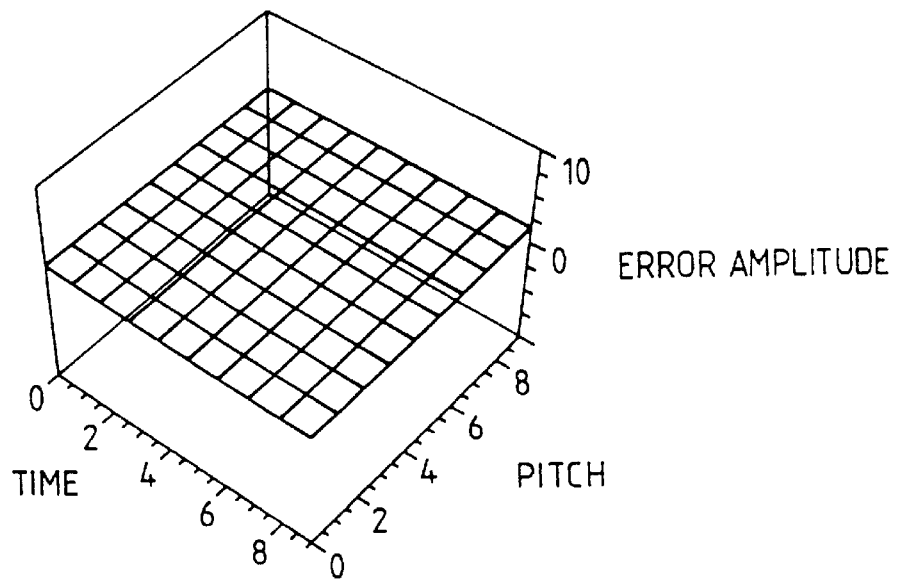

FIGS. 10a and 10b, show respectively a plot of distortion amplitude over time and path axes for homogenous distortion, and a table showing the amplitude value for each cell of the plot. All the values are the same because the error is uniformly distributed over time and pitch as shown in FIG. 10a, the total error activity $E_A$ is 200 and the error entropy $E_E$ is at a relatively high level of 4.605.

Figures 11A, 11B:
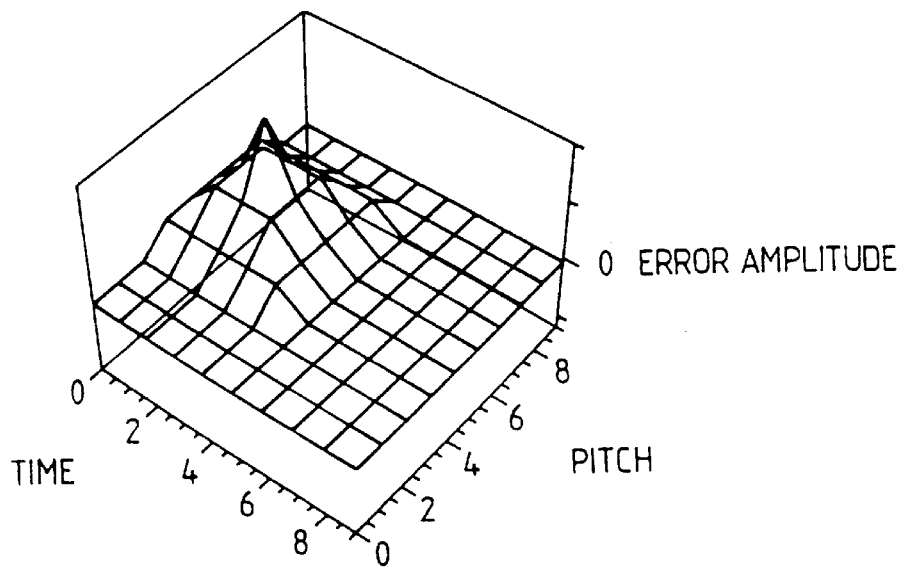
FIG. 11a is a plot corresponding to FIG. 10a for a first non-homogeneous distortion.
FIG. 11b is a corresponding table of amplitude values.

Referring to FIGS. 11a and 11b, the same amount of total error (error activity $E_A$ =200) is distributed substantially into a broad peak. The error entropy $E_E$ is correspondingly lower ($E_E$ =3.294).

Figure 12A:
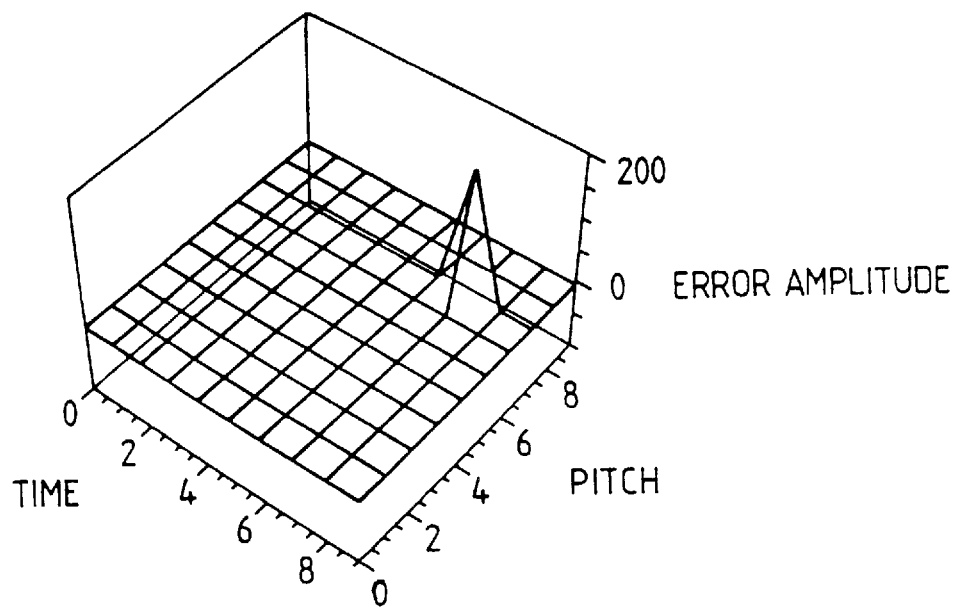
FIG. 12a is a plot corresponding to FIG. 10a for a second non-homogeneous distortion.

Referring now to FIGS. 12a and 12b, where the same amount of error is contained in a single spike in a single time/pitch cell, the error entropy is much lower ($E_E$ =0.425).

FIG. 12c illustrates the effect which would be achieved by scaling the error at every time/pitch cell by 10. The total amount of error ($E_A$) has increased to 2000, but the error entropy ($E_E$) is still 0.425.

Thus, the error entropy $E_E$ gives a measure of the distribution of the error which is independent of the magnitude of the total amount of error, whereas the error activity $E_A$ gives a measure of the amount of error which is independent of its distribution.

In fact, to take account of the logarithmic units of the audible error amplitude scale employed in this embodiment, it is convenient to recast $E_A$ and $E_E$ as $E'_A$ and $E'_E$ as follows:

$$E'_A = \sum_{i=j}^{n} \sum_{j=1}^{m} 10|e(ij)|$$

and $$E'_E = -\sum_{i=1}^{n} \sum_{j=1}^{m} 10^{e(ij)} E_A * \ln[10^{(e(ij))}] E_A$$

The error activity and error entropy measures can be combined to give a good indication of what the subjective listener response to distortion would be, in a manner which is relatively robust to the actual nature of the distortion.

For example, we have found that a good indication of the subjective "listening effort" measurement $Y_{LE}$ is given by $$Y_{LE} = -a_1 + a_2 \log_{10} E'_A + a_3 E'_E$$

where $a_1 = 8.373$; $a_2 = 0.05388$; and $a_3 = 0.4090$.

In greater detail, therefore, the process performed by the analyser 8 in the combining step 110 comprises:

1. Calculating $E_E$ and $E_A$ for each time segment of the input signal.
2. Summing the error activity and error entropy values over time to form an average error activity $E_A$ and an average error entropy $E_E$ over the whole duration of the test signal.
3. Forming a measure of the subjective impact of distortion, $$Y_{LE} = -a_1 + a_2 \log_{10} E'_A + a_3 E'_E$$

The averages formed in step 2 above may simply be arithmetic means, or (with appropriate scaling elsewhere in the combination process) sums. However, preferably, the averages are formed with different weightings being given to the error activity and error entropy values from different time segments, depending upon their importance to a listener. For example, segments of the input signal which correspond to sounds which occur frequently in natural speech may be given a higher weighting, since distortion of these sounds will be particularly noticeable to the listener. Further, a higher weighting may be given to time segments which follow time segments containing silence, so that the noticeable effects of clipping of the beginnings of words (which considerably reduces intelligibility) due to the delayed onset of voice switches are given a high weighting.

Further details of the derivation of the function used to combine the error activity and error entropy value in the step 110 will now be discussed.

Figure 13:
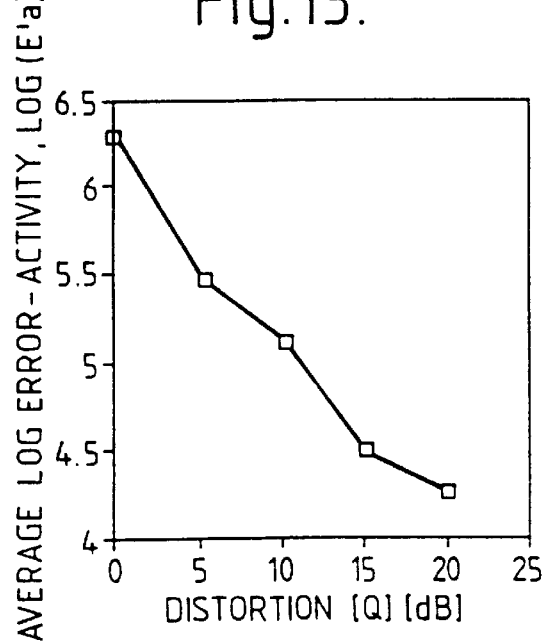
FIG. 13 is a graph relating error magnitude to level of distortion of one example of imposed MNRU distortion.

The effects of modulated noise reference unit (MNRU) distortion were added to pre-recorded files of human speech, used as test signals in place of the input signal 1, and average error activity and error entropy values were derived using the analyser 8 following steps 101 to 120 described above. The analysis was repeated for different levels of distortion, and the resulting error activity and error entropy values are plotted against the level of distortion in FIGS. 13 and 14 respectively. It will be seen that the log error activity is approximately negatively proportional to the level of distortion, and that the error entropy is approximately proportional to the level of distortion.

Figure 15:
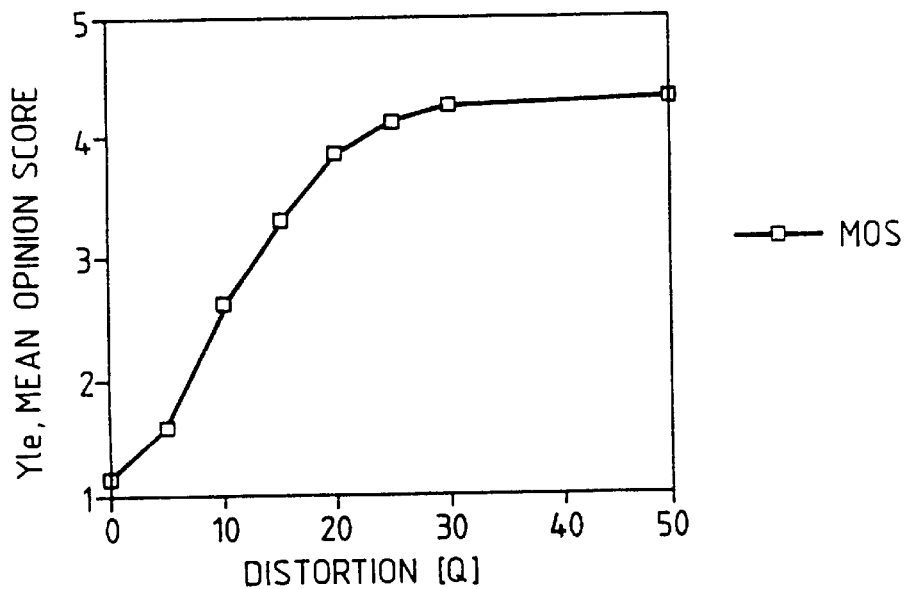
FIG. 15 is a graph relating a subjective assessment of distortion by human listeners to imposed distortion in the same example.

Next, the same distorted speech was played to a panel of human listeners, who provided subjective measurements of listening effort $Y_{LE}$ according to internationally followed experimental practice, on a scale of 1–5. The average of the human listeners' scores (mean opinion score: MOS) for the varying levels of distortion is shown in FIG. 15. The shape of the relationship of FIG. 15 can be described by:

$$(Y-1)/(Y\max-1) = 1(1+e^{4S(M-Q)})$$

where Y is the opinion score, S=0.0551, M=11.449, Ymax=4.31, and Q is the equivalent quantisation distortion in dB.

Figure 14:
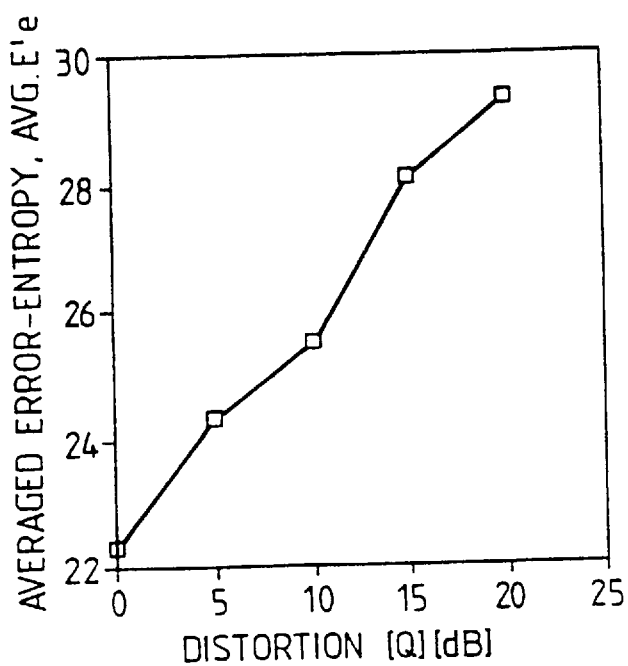
FIG. 14 is a graph relating error distribution to imposed distortion in the same example.

Next, the log error activity values and the error entropy values shown in FIGS. 14 and 15 were fitted, by linear regression, to the distortion levels. The regression gave the relationship:

Distortion $Q = -55.09 - 0.5556 \log_{10} E'_A + 2.624 E'_E$

Next, the relationship between the distortion and the opinion score $Y_{LE}$ subjectively determined by human listeners was used to convert the relationship between distortion and error activity and entropy to an estimation of opinion scores (based on error activity and error entropy). The relationship thus given is:

$$Y_{LE} = -8.373 + 0.05388 \log_{10} E'_A + 0.4090 E'_E.$$

Figure 16:
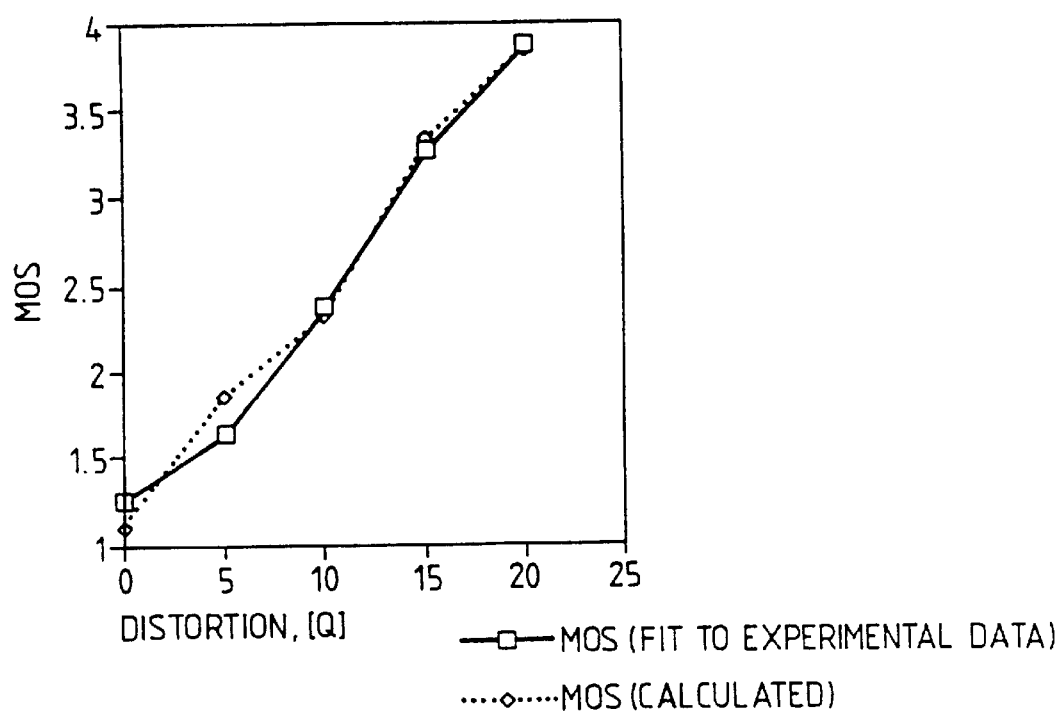
FIG. 16 shows part of the graph of FIG. 15, together with a estimated subjective level of distortion derived according to the invention from the data of FIGS. 13 and 14.

In FIG. 16, the dotted trace shows the predicted subjective opinion score calculated in this manner and the solid line indicates the actual subjective opinion scores (redrawn from FIG. 15). The agreement is seen to be close.

To determine the robustness of the predicted subjective opinion score thus calculated, the last calculation above was utilized in the combining step of an analyser 8 according to the invention. The signal generator in this test merely supplied pre-recorded, known, human speech, and the telecommunications apparatus 2 was three commercial low bitrate coder/decoders (codecs). The output of the codecs were also played to a bank of human listeners, who rated the quality of the output, as above, on a scale of 1–5.

The distortion introduced by each codec is complex, but includes some quantisation distortion and some time varying distortion due to adaptation of the codec in use.

Although linear regression has been described above as a method of finding the combination process used in the combination step 110, it would equally be possible to use a higher order regression, for example a logistic and double quadratic expansion as follows:

$$\text{logit }(Y_{LE}) = b_0 + b_1 E'_A + b_2 E'^2_A + b_3 E'_A E'_E + b_4 E'_E + b_5 E'^{2-\ln}_E (Y_{LE}/(4-Y_{LE}))$$

Then the estimated value of opinion score Y', is given by:

$$Y' = 4/(1+e^{-w})$$

where $w = \ln(Y_{LE}/(4-Y_{LE}))$

The logistic (logit) function is defined in Finney "Probit Analysis" (Cambridge University Press, 1971) as logit $(y) = \ln(P/1-P)$ where P is the normalized variate $(Y-Y(\min)) / (Y(\max)-Y(\min))$, Y is the experimentally determined opinion and y is the distortion variable.

Finding the coefficients $b_i$ is achieved by an iterative weighted least squares calculation; many statistical calculation programs are available for this purpose, including for example a commercially available statistical package known as GLIM (TM).

To illustrate the behavior of this technique, the error-surface descriptors were calculated for a sample speech corpus processed by four different types of degradation. The degradations were algorithmically generated and deliberately chosen to span a range of subjective opinions. The distortion types ranked by a panel of six subjects in rank order were (i) Digital Circuit Multiplexer Equipment (DCME) (including VAD and data reduction)
(ii) Speech codec A (with error pattern EPX (Error Pattern X))
(iii) Nonlinear amplifier distortion
(iv) Speech codec C (with error pattern EPY (Error Pattern Y))

The error patterns EPX and EPY were nonstandard and chosen to give the desired subjective ranking. The types of distortion include different codec types, a nonlinear amplifier characteristic, and a temporal distortion owing to the VAD (voice activity detector) in the DCME. As such the distribution of error is very different for the four distortion types and a simple average of the error surface fails to provide the correct subjective ranking. The following table shows the average error and MOS prediction generated by the method for the four degradations.

| Degradation | Subjective Ranking | Average $\log_{10}$ (error) | MOS prediction |
| --- | --- | --- | --- |
| DCME | best 1 | 7.288 | 4.04 |
| Speech codec A (EPX) | 2 | 7.232 | 3.12 |
| Nonlinear amplifier | 3 | 7.810 | 2.97 |
| Speech codec C (EPY) | worst 4 | 7.555 | 2.36 |

It is apparent that the average error does not indicate the correct subjective ranking whilst the MOS prediction, which takes account of the error, does predict the correct subjective ranking.

Thus, it will be seen that this method is capable of providing an indication of distortion of telecommunications apparatus which is close to the subjective opinion of a human listener, and is relatively robust to different types of distortion.

In a second embodiment of the invention, the signal is generated in the same manner as in the first embodiment. However, the operation of the analysis unit 8 differs in step 102.

Although the logarithmically spaced filters of the first embodiment are found to be a reasonable approximation to the pitch scale of the human ear, it is found that an even better performance is given by the use of filters which are evenly spaced on a Bark scale (as discussed above). Accordingly, in step 102, the twenty bandpass filters are rounded exponential (roex) filters spaced at one Bark intervals on the pitch scale. The round exponential function is described in "Suggested formulae for calculating auditory-filter bandwidths and excitation patterns", (J. Acoust. Soc. Am. 74, 750–753 1983), B. C. J. Moore and M. R Glasburg.

Rather than calculating the average signal amplitude in each band every four milliseconds, in this embodiment, the signal amplitude is calculated over different averaging periods for the different bands, averaging over two milliseconds for the highest pitch band and 48 milliseconds for the lowest pitch band, with intervening averaging times for the intervening bands. It is found that varying the temporal resolution in dependence upon the pitch (or, in general, the frequency) so as to resolve over a longer interval at lower frequencies gives a substantially improved performance.

For subsequent processing, as before, for each two millisecond time segment, an array of bandpass filter output values are generated. For bands lower than the highest pitch, values are repeated more than once for intervening time segments (for example, for the lowest pitch band, each value is repeated 24 times for the two millisecond time segments between each 48 millisecond average amplitude value). It would, of course, be possible to perform a numeric interpolation between succeeding values, rather than merely repeating them.

The steps 103–106 are the same as in the first embodiment (with the adjustment of numerical constants to reflect the different filter responses).

In this embodiment, the analyser 8 is arranged to perform one further step in the process of FIG. 7b, to calculate the extent to which the distortion of the test signal is correlated to the original signal over time.

This enables the analyser 8 to take account of the (subjectively noticeable) effects of delay, echo and "pre-echo", (i.e. the early arrival of a small portion of the test signal).

A separate set of correlation values are calculated for one or more of the frequency or pitch bands. Denoting the amplitude value of the difference or transfer function surface calculated in this step 108 for a single frequency band as $x_i$, and the corresponding element of the excitation surface of the test signal calculated in step 106 as $y_i$, and the length of the analysis segment as N (typically, the length of a segment of the test signal), the analyser 8 calculates a set of cross correlation coefficients $R_i$, where i=0, 1, 2. . ., by calculating:

$$h_j = \sum_{k=0}^{q-1} x_k y_{j+k}$$

for j=. . . −2,−1, 0, 1, 2, . . . and
$R_{ij}=h_{i-(n-1)}$
for i=0, 1, 2. . .

The two significant parameters are the delay between the test signal and the corresponding echo portion of the distorted signal, and the amplitude of the echo portion of the distorted signal. The amplitude of the echo portion is given by the largest value of cross correlation coefficient ($R_i$max), and the delay is given by the value of i which corresponds to that maximum.

In this embodiment, each of these parameters is fitted (e.g. by linear regression) so that the predicted subjective opinion score $Y_{LE}$ is a function of the error activity, error distribution, error delay and error temporal correlation.

Effects of the Invention

Referring to FIGS. 9a–9e, the representation of various types of telecommunications apparatus distortion of the test signal of FIG. 8a by the first embodiment of the invention will now be illustrated.

FIG. 9a shows the error excitation surface produced by instantaneous amplitude distortion produced by adding low amplitude second and third order terms to the signal. The distortion was characterized as "barely audible" by a human listener. FIG. 9c shows the corresponding error amplitude surface for fully audible non-linear distortion of the same type, but with higher value second and third order terms. The amplitude of the error is much larger. Additionally, it will be seen that the majority of the distortion loudness coincides with the voiced part of the test signal of FIG. 8a, since this contains low frequency format tones whose harmonics are perceptually significant.

Figure 9B:
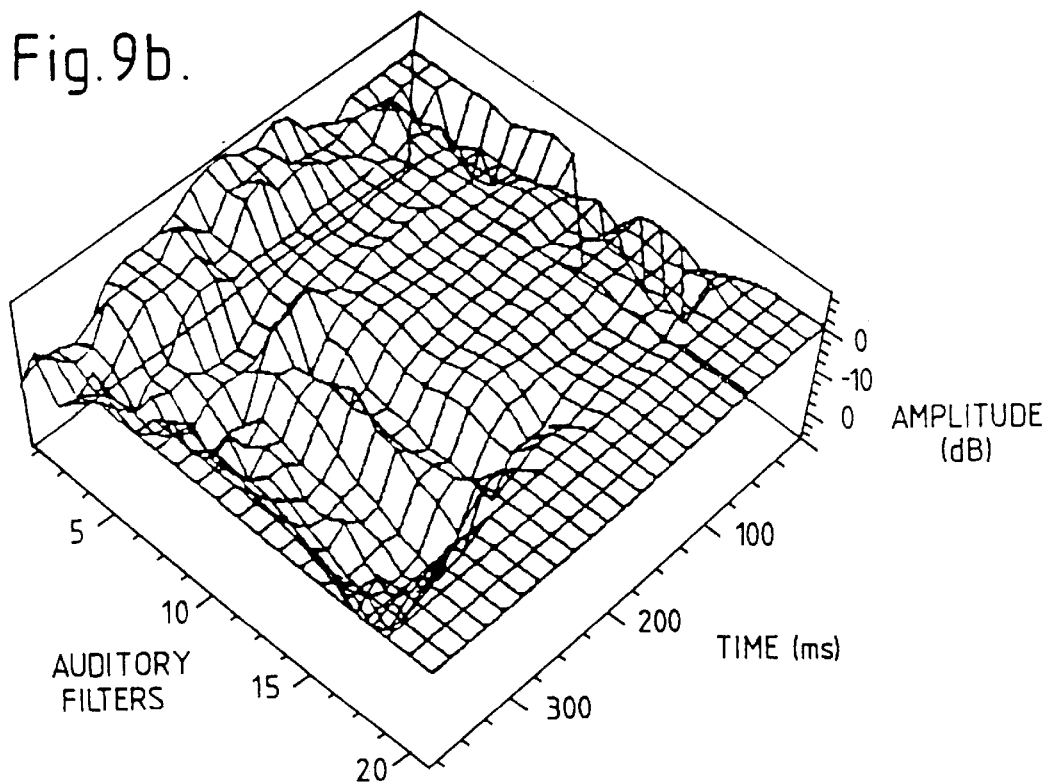
Figure 9C:
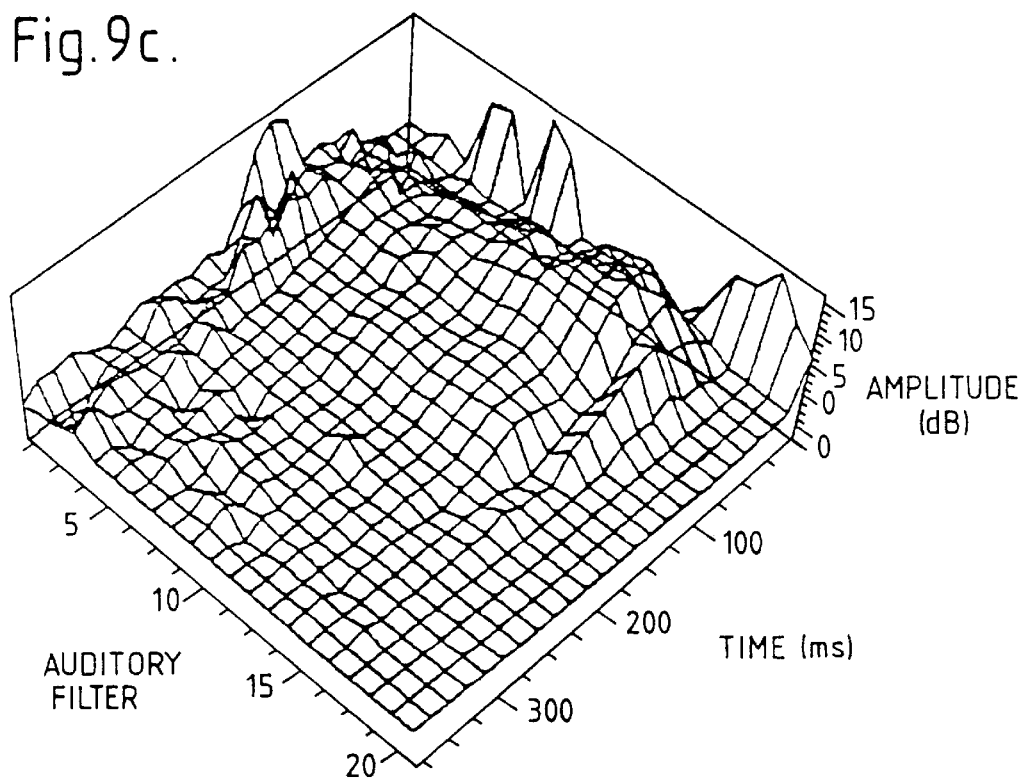
Figure 9D:
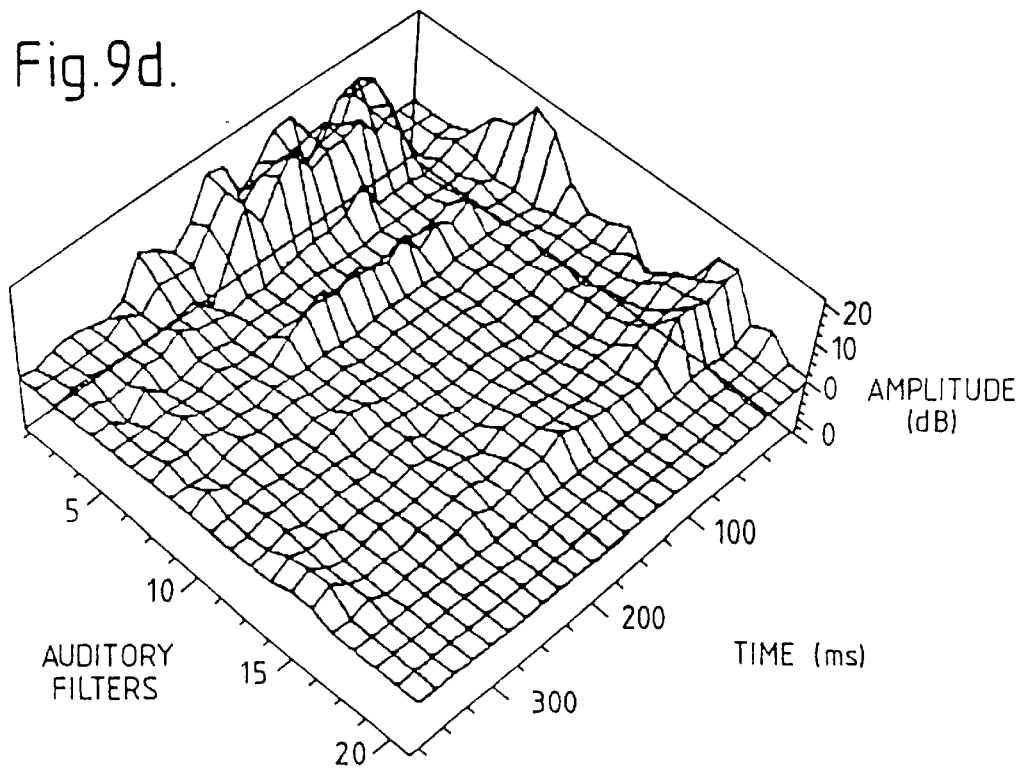

Referring to FIG. 9d, the effects of modulated noise reference unit (MNRU) distortion are shown. MNRU distortion is described in Annex A of CCITT Recommendation P81, and is designed to be theoretically equivalent to the distortion introduced by a single A Law PCM stage (of the kind widely used in telecommunications systems). The level of distortion was characterized as fully audible by a human listener. Again, it will be seen from FIG. 9c that the perceptual distortion is associated chiefly with formants in the voiced part of the test signal.

Referring to FIG. 9b, when crossover distortion is supplied ( i.e. distortion of the kind y=mx+c for x greater than zero and y=mx−c for x less than zero) low amplitude signals are not transmitted, and so the lower energy unvoiced sound in the second part of the test signal is drastically attenuated. FIG. 9d therefore suggests a very significant subjective impact of this kind of distortion, which corresponds with the reaction of the human listener.

Figure 9E:
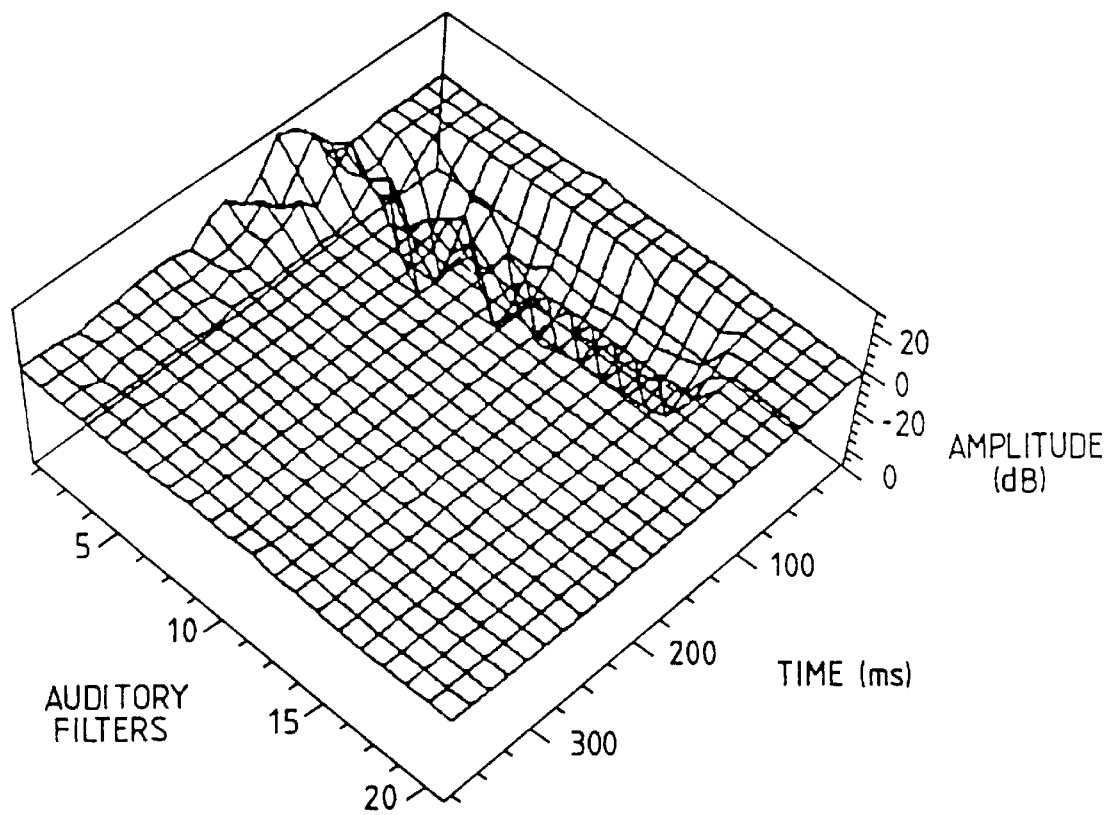

Finally FIG. 9e illustrates the effects of a voice activity detector with a 50 millisecond onset time. In the initial part of the signal, there is a large (negative) error because the signal has been clipped. The following (positives error is due to overshoot or settling.

It will be clear from the foregoing that many variations to the above described embodiments can be made without altering the principle of operation of the invention. For example, the distorted speech signal could be received via an artificial ear acoustic structure as described in the above CCITT Recommendation and our earlier UK patent application GB2218299 (8730346) incorporated herein by reference. This would reduce the filtering needed in the step 101.

As well as using the error activity and distribution measures to determine the subjective impact of distortion, as discussed above, in further embodiments the rate of change of these parameters over time during the test signal, is used since rapidly changing distortion may sound less acceptable to a listener.

Although in the above described embodiments, a single decay profile for temporal masking is described, it may be preferred in alternative embodiments of the invention to provide a plurality (for instance two) of decay rates for forward (and backward) masking, and to select the required decay rate in dependence upon the duration of the masking sound (i.e. the number of time segments over which the amplitude in one of the passbands exceeds a predetermined level). For example, maximum and minimum decays (corresponding to 200 milliseconds and 5 milliseconds duration respectively, may be defined by;

$$y=58.4039*10^{(-0.0059x)}$$

$$y=55.5955*10^{(-0.0163x)}$$

The output from the analyser 8 can simply be output to a display, or it may be used to control a telecommunications system directly, by selecting signalling routings according to the performance of the various elements of the system, or alerting operators to faults. The apparatus may be integrated into a network management system.

Although the analysis unit 8, the speech recognizer 3, speech generator 7 and adaptor 4 have been described as separate hardware, in practice they could be realized by a single suitably programmed digital processor.

Although the embodiments described above relate to testing telecommunications apparatus, the application of novel aspects of the invention to other testing or analysis is not excluded.

We claim:

1. A method of analysis of the audio quality of a communications system carrying speech signals, comprising the steps of:

applying speech recognition process to an output of the communications system to produce a speech recognition process output;

generating, based on said speech recognition process output, an estimate of the original speech signal applied to the input of the communications system;

comparing the estimated input signal with the output signal of the communications system; and generating a performance estimate based on said comparison.

2. A method according to claim 1, comprising the additional step of adapting at least one of the macro-properties of the speech elements in the estimated signal to match those in the output signal.

3. A method according to claim 2, wherein the durations of individual speech elements in the estimated signal are adapted to match those in the output signal.

4. A method according to claim 2, wherein the pitches of individual speech elements in the estimated signal are adapted to match those in the output signal.

5. A method according to claim 1, wherein the comparison step comprises a perceptual analysis technique.

6. A method of controlling a telecommunications network, wherein communications links within the network are monitored and analyzed by a method according to claim 1.

7. An apparatus for monitoring signal quality in a communications link, the apparatus comprising:

means for recognizing speech elements in signals received over the communications link;

estimation means for generating, based on the recognized speech elements, an estimate of the original speech signal;

comparison means for comparing the estimated signal with the received signal; and output means for providing a performance estimate based on the comparison.

8. Apparatus according to claim 7, wherein the estimation means includes means for adapting the macro-properties of the estimated signal to correspond with those of the received signal.

9. Apparatus according to claim 7, wherein the comparison means is a perceptual analysis system.

10. A telecommunications system having an apparatus for measuring signal quality in one or more communications links according to claims 7.

11. A telecommunications system according to claim 10, having means for selecting signalling routings in response to the outputs from the comparison means.

12. A telecommunications network management system comprising apparatus according to claim 7, and means for controlling elements of a telecommunications network in response to the performance estimates generated by the output means.

13. An apparatus for monitoring signal quality in a communications link, comprising:

a speech recognition circuit having an output comprising recognized elements in signals received over said communications link;

an estimator generating an estimate of the original speech signal based on the output of the speech recognition circuit;

a comparator comparing the estimated signal with the received signal; and an output circuit providing a performance estimate based on the comparison.

* * * * *